J. P. BETHKE AND R. H. STEARNS.
MAGNETIC PULLEY.
APPLICATION FILED JAN. 22, 1920.

1,407,051.

Patented Feb. 21, 1922.

Inventor
John P. Bethke
Roswell H. Stearns
By Erwin Wheeler & Woolard
Attorneys

UNITED STATES PATENT OFFICE.

JOHN P. BETHKE AND ROSWELL H. STEARNS, OF MILWAUKEE, WISCONSIN, ASSIGNORS TO MAGNETIC MANUFACTURING CO., OF MILWAUKEE, WISCONSIN, A CORPORATION OF WISCONSIN.

MAGNETIC PULLEY.

1,407,051. Specification of Letters Patent. Patented Feb. 21, 1922.

Application filed January 22, 1920. Serial No. 353,346.

*To all whom it may concern:*

Be it known that we, JOHN P. BETHKE and ROSWELL H. STEARNS, citizens of the United States, residing at Milwaukee, county of Milwaukee, and State of Wisconsin, have invented new and useful Improvements in Magnetic Pulleys, of which the following is a specification.

This invention relates to magnetic pulleys. One of the objects of this invention is to produce a magnetic pulley having a high flux density with a minimum amount of exciting windings.

Other objects are to produce a magnetic pulley in which all of the exciting windings are located adjacent the periphery of the pulley in comparatively shallow recesses; in which the interior of the pulley as well as the exterior is utilized for space for the exciting windings; in which a better distribution of magnetic flux is secured; in which the various parts may be readily assembled and disassembled; in which an increased current density in the exciting windings may be employed; and in which efficient means are provided for cooling the pulley.

Figure 1:
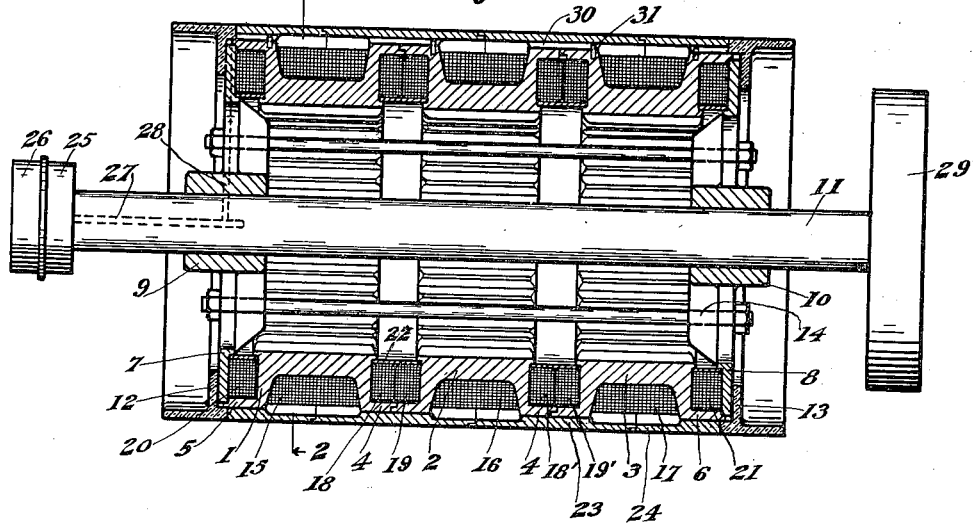
Fig. 1 is a longitudinal view through the magnetic pulley.
Figure 2:
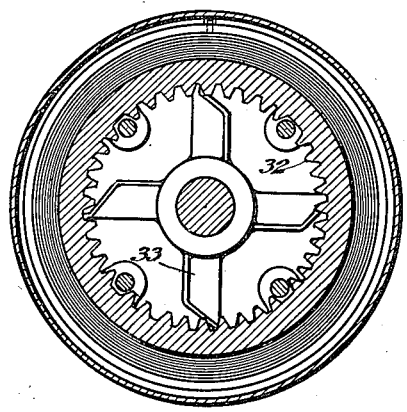
Fig. 2 is a sectional view on the line 2—2 of Fig. 1.

The magnetic pulley comprises a plurality of annular spools 1, 2 and 3 formed of magnetic material and provided with interlocking flanges 4 whereby each spool may be supported by the adjacent spools. The end flanges 5 and 6 are supported by end plates 7 and 8 whose hubs 9 and 10 are secured upon a shaft 11. Beyond the end plates 7 and 8 protecting flanged plates 12 and 13 are provided of non-magnetic material to protect the pulley from magnetic material which might otherwise adhere to the end faces of the pulley and adjacent the outer corners. Tie rods 14 pass longitudinally through the center of the pulley and engage the end plates 7 and 8 to draw such end plates towards each other and firmly clamp the magnetic spools 1, 2 and 3 in position so that the pulley forms a unitary structure having the supporting hubs 9 and 10 secured to the shaft in any suitable manner so that all of the magnetic spools may rotate with the shaft as a unitary body. Exciting windings 15, 16 and 17 are wound in shallow grooves formed in the exterior portion of the spools 1, 2 and 3. The flanges 4 of the successive spools extend a material distance laterally and form, when interlocked, an inner recess in which is placed a pair of exciting windings 18 and 19. The end flanges 5 and 6 have exciting windings 20 and 21 positioned thereunder. Supporting rings 22 are positioned inside the inner exciting windings and such supporting rings rest upon shoulders formed in the magnetic spools. An outer casing of magnetic material is provided for the entire active face of the pulley. This casing comprises thickened portion 23 formed adjacent the flanges of the magnetic spools and thinner portions 24 extend laterally from the thickened portions. These thinner portions 24 interlock and form a protecting covering for the exterior exciting winding.

At one end of the shaft 11 slip rings 25 and 26 are provided which are adapted to lead the current into and out of the windings. The slip rings are connected with the windings by conductors which pass through ducts 27 and 28 formed in the shaft and in the pulley. The windings are usually connected in series.

The direction of current flow is such that in each succeeding coil the current is in a reverse direction from that in the preceding coil. That is to say, if the current flows towards the observer in the lower section of the exciting winding 15 the current will flow away from the observer in the lower section of the exciting windings 18 and 20. This will cause the flange 5 to be a north pole and the flange 4 to be a south pole. The direction of current in the exciting winding 19 is in the reverse direction from that of the exciting winding 18 adjacent thereto. That is to say, the current in the lower section of the exciting winding 19 flows towards the observer. In the lower section of the exciting winding 18' the current flows towards the observer and in the lower section of the exciting winding 16 the current flows away from the observer. This causes the flanges 4 to become south poles, and the flanges 4' to become north poles. The action of the exciting windings 15, 16 and 17 is clear. The action of the exciting windings 20 and 21 is also clear. The action of the exciting windings 18, 19 and 18', 19' is as follows: Current is caused to pass along a conductor in these windings laid adjacent magnetic material on the side of such winding. This induces a magneto motive force in the adjacent magnetic material which tends to cause magnetic flux to pass through such magnetic material in a direction to aid that produced by the exterior exciting windings.

This effect is of the same nature as that produced by two infinitely long conductors laid parallel and spaced by a magnetic strip also of infinite length and with the current in the conductors flowing in opposite directions. The effect of both of these conductors is to produce a magnetic whirl with the conductor as the axis of this whirl. The magnetic strip is tangent to each of these whirls and the magneto motive force induced therein by the current in each of the conductors is in the same direction. That is to say, they aid each other in producing a magnetic flux through the magnetic material. The same action takes place in this magnetic pulley and it has been found that a great increase in the magnetic strength of the pulley, that is to say, a great increase in the total flux actively supplied by the pulley, is produced by the interior exciting windings.

The protecting exterior sheet of magnetic material serves to affect a more uniform distribution of the magnetic flux passing outwardly from the pulley. The major part of the flux passes through the thickened portions 23 adjacent the faces, a part passing outwardly into the air therefrom and a part passing along the thinner portions 24 and then passing outwardly into the air. Of course, a small fraction of the flux leaks across from one flange to the other through the thinner portions, but there is a magnetic joint or gap of poor magnetic conductivity formed in this path and it has been found that the flux leakage is negligibly small. It will be seen that the varying reluctance, which is provided by the varying thickness of magnetic sheath, causes a very uniform distribution of the flux exteriorly of the pulley—the joint or gap in each of the thinner portions enhancing the uniform distribution of the flux due to the increased reluctance that is provided at points intermediate successive poles.

The shaft may be driven by means of a pulley 29 secured thereto in any convenient manner and position, for example, at the other end from that occupied by the slip rings. The protecting casing surrounding the pulley may be prevented from slipping by means of key ways 30 cut in the thickened portions 23 and cooperating keys or dowel pins 31 set in the magnetic spools.

The interior portion of the magnetic spools are fluted as indicated at 32 in order to provide additional cooling surface. The supporting end plates 7 may be provided with vanes 33 which function as fans to cause a current of air to circulate through the pulley when the pulley is rotated and also serve to support the outer portion of the supporting end plates 7 and 8.

It will thus be seen that a magnetic pulley has been produced which is composed of easily assembled parts and in which the interior as well as the exterior of the pulley is utilized for winding space for the exciting coils and in which an increased facility for cooling is provided.

We claim—

1. A magnetic pulley comprising a hollow magnetic member, an exciting coil upon the exterior of said member, and an exciting winding upon the interior of said pulley, both of said coils being co-axially mounted with respect to said hollow magnetic member.

2. A magnetic pulley element comprising a magnetic spool having a groove around its outer periphery, a flange at each end extending first radially outwardly and then substantially parallel to the axis of the pulley, an exciting winding positioned within said groove, and exciting windings positioned beneath said flanges.

3. A magnetic pulley comprising a plurality of hollow magnetic spools, exciting coils wound upon said spools, and exciting coils wound within the interior of a portion of said spools.

4. A magnetic spool for a magnetic pulley comprising a body portion, flanges extending therefrom, said flanges extending first radially outward and then substantially parallel to the axis of the pulley and away from said body portion.

5. A magnetic pulley comprising a series of magnetic spools, exciting windings associated therewith and a magnetic sheath covering said spools, said sheath having a relatively thick portion in proximity to the adjacent portions of successive spools and relatively thinner intermediate portions.

6. A magnetic pulley comprising a series of magnetic spools, exciting windings associated therewith and a magnetic sheath covering said spools, said sheath having a relatively thick portion in proximity to the adjacent portions of successive spools and relatively thinner intermediate portions, said thinner portions having joints formed therein.

7. A magnetic pulley comprising a series of interlocking magnetic spools, exciting windings beneath the interlocking portions.

8. A magnetic pulley comprising a series of spools of magnetic material, exciting windings upon said spools, and exciting windings within said spool, said inner exciting windings having a central opening, whereby an unobstructed free passage is provided throughout the entire pulley.

9. A magnetic pulley comprising a series of hollow interlocking magnetic spools, exciting windings upon said spools, and hollow exciting windings beneath said interlocking portion.

10. A magnetic pulley comprising a series of interlocking magnetic spools and exciting windings beneath the interlocking portions, said interlocking portions adapted to provide mutual support from successive spools.

In testimony whereof we affix our signatures in the presence of two witnesses.

JOHN P. BETHKE.
ROSWELL H. STEARNS.

Witnesses:
A. R. WOOLFOLK, Jr.,
O. C. WEBER.